March 17, 1959     I. J. STARWORTH     2,877,570

GLOBE AND METHOD OF MANUFACTURING

Filed March 31, 1955     3 Sheets-Sheet 1

INVENTOR.
IRVING J. STARWORTH
BY

March 17, 1959  I. J. STARWORTH  2,877,570
GLOBE AND METHOD OF MANUFACTURING
Filed March 31, 1955  3 Sheets-Sheet 2
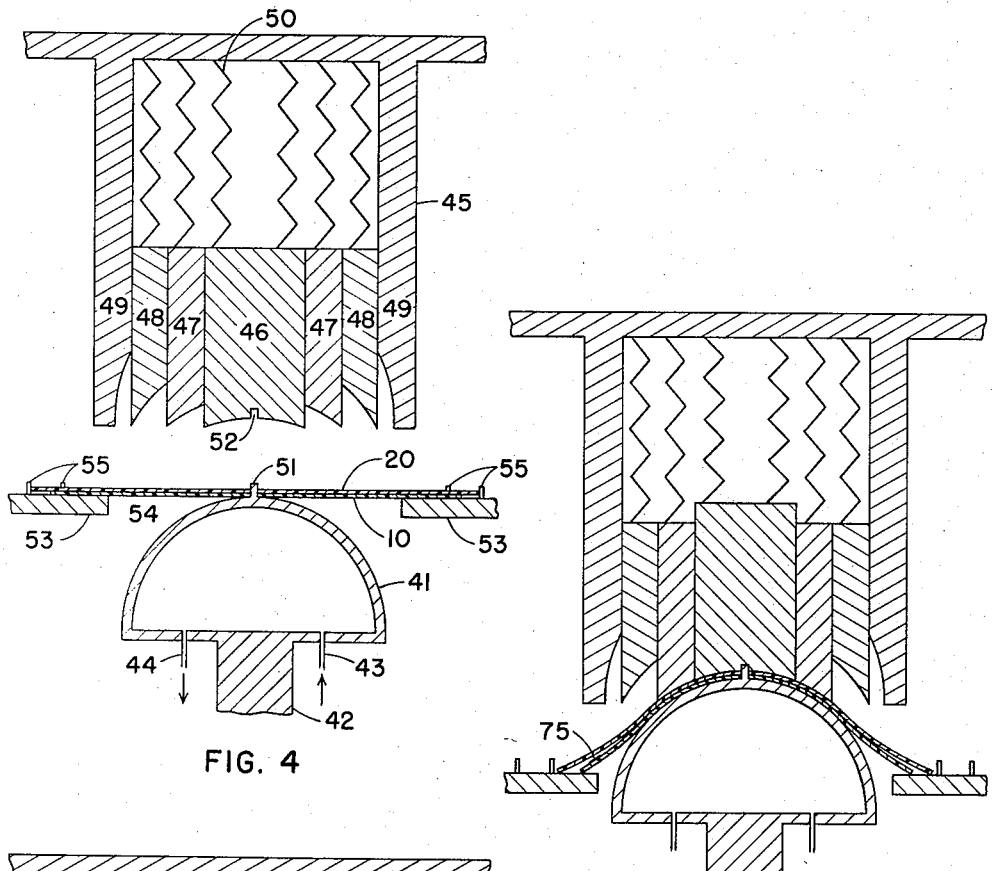
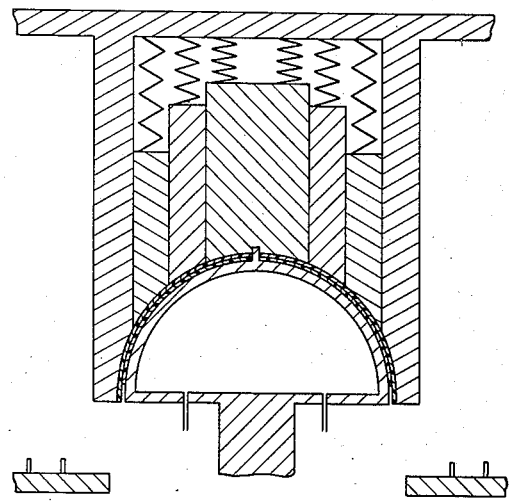
FIG. 6
INVENTOR.
IRVING J. STARWORTH
BY

*INVENTOR.*
IRVING J. STARWORTH
BY Milton Zucker

United States Patent Office 2,877,570
Patented Mar. 17, 1959

2,877,570

GLOBE AND METHOD OF MANUFACTURING

Irving J. Starworth, Elmont, N. Y., assignor of twenty percent to Milton Zucker, New York, N. Y.

Application March 31, 1955, Serial No. 498,206

3 Claims. (Cl. 35—46)

This invention relates to terrestrial and celestial globes, and aims to provide an inexpensive printed globe of unusually attractive appearance, and a method for producing the globe rapidly, accurately and economically.

There are at the present time two principal commercial methods for producing globes. Better grade globes are made by printing a flat sheet of paper or parchment with the desired map. This print, cut into segments of convenient size, is then applied to the sphere by hand, any distortion inherent in converting the flat sheet to the form of a spherical surface being compensated for in the mounting process. Since proper application requires real skill, the cost of better grade globes is rather high.

Cheaper globes have been made by lithographing pasteboard and the like, and then molding the pasteboard onto a hemispherical base, or by lithographing metal and drawing it into a hemisphere; the hemispheres are joined to each other by an equatorial band. In these processes, the flat prints are distorted to compensate for the distortion inherent in the drawing process. Such processes produce globes of inferior appearance, because of the equatorial band which joins the hemispheres.

I have invented both a method of making a globe, and a globe which is as accurate as the better hand-made globes, which is as pleasing to the eye, and which can be made rapidly and inexpensively by machine processes. My globe comprises a printed map sandwiched between inner hemispheres of moldable material and outer hemispheres of transparent plastic, with the unprinted set of hemispheres being larger than the printed set in some portions, and smaller in others, so that when the hemispheres are put together, they can be securely cemented by the overlap of plastic material.

The invention can best be understood by referring to the accompanying drawings, in which Fig. 1 is a plan view of a die cut flat map sheet which forms one half of my globe.

Fig. 4 is a sectional view through the forming and laminating press which is a feature of my invention, with the sheets forming a hemisphere in place, ready for forming and lamination.

Fig. 5 is a view similar to Fig. 4, showing a stage in the formation of the hemisphere.

Fig. 6 is a similar view showing the end of the hemisphere forming operation.

Figure 1:
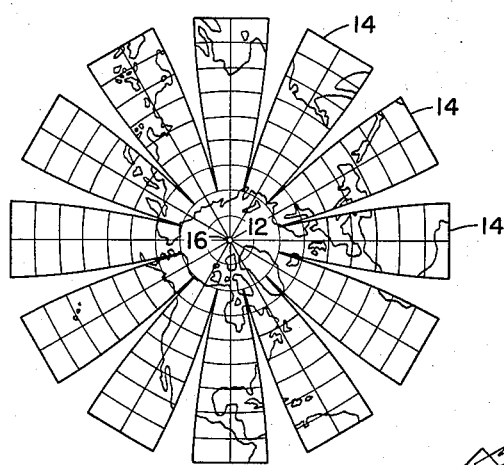

In accordance with my invention, I print a map on a flat sheet 10 of material which is moldable by heat and pressure. I may use impregnated paper, thermoplastics such as polyvinyl chloride, polystyrene, polyethylene, polytetrafluoroethylene (Teflon) etc., or any other material which can be deformed in this fashion. I prefer to work with such materials which are readily moldable. This printed sheet is then die cut into the shape shown in Fig. 1, comprising a polar cap 12 to which are attached gores 14, which together can be deformed into a hemisphere. A polar hole 16 is punched through the sheet. Using a set of 12 gores, each describing 30° of longitude, I get minimum distortion; the difference between chord and arc is less than 1 part in 88. It is thus apparent that compensation is rather easy.

Figure 2:
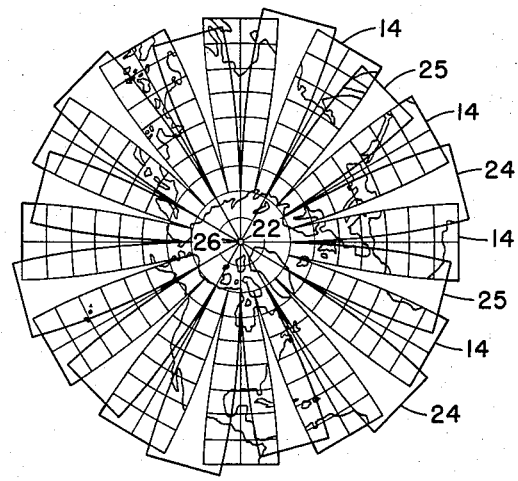
Fig. 2 is a plan view of the assembly of die cut map sheet and laminating plastic sheet forming one half of my globe.
Figure 3:
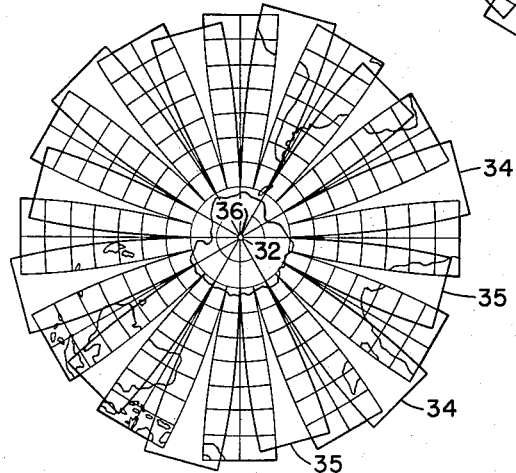
Fig. 3 is a view similar to Fig. 2, of the other half of the globe.
Figure 7:
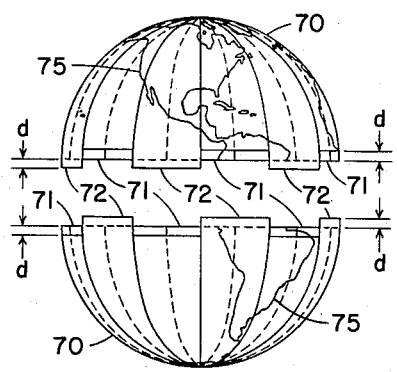
Fig. 7 is an elevation showing the hemispheres ready for globe formation.
Figure 8:
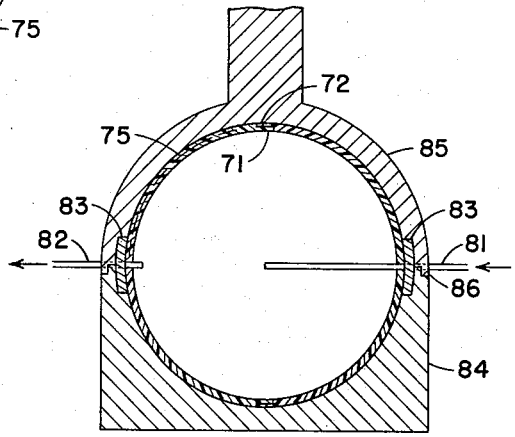
Fig. 8 is a section through the globe forming press.
Figure 9:
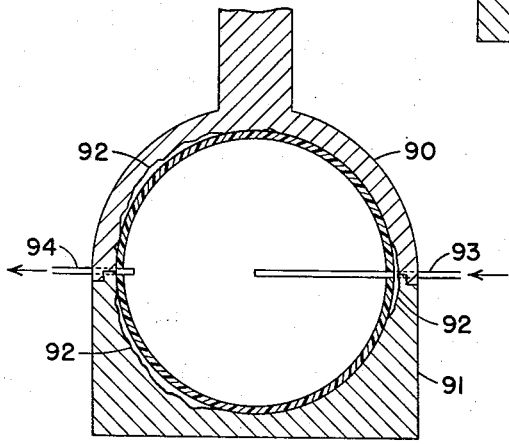
Fig. 9 is a section through a globe embossing press.

I provide a similar die cut sheet of transparent plastic 20, consisting of an identical polar cap 22, gores 24 which are somewhat longer than the printed gores 14 by a distance "d," alternating gores 25 which are shorter than the printed gores 14 by the same distance, and a central hole 26. The sheet 20 is laid on the sheet 10, as shown in Fig. 2, with the gores 24—25 covering the openings between the gores 12, being staggered exactly 15° to insure final register of the complete globe.

A similar plastic sheet 30, with a central polar cap 32, gores 34—35 and polar hole 36 is provided to cover the second printed hemisphere, which is identical with the first except as to printing.

As shown in Fig. 4, I provide a forming press consisting of a hemispherical forming die 41, mounted on a piston 42 which is preferably hydraulically actuated. Couplings 43—44 are provided in the die, so that the die can be heated or cooled by forcing in a heating fluid or a cooling fluid. The anvil 45 is segmented into multiple sections, 46, 47, 48, 49, each of which comprise a section of a hemisphere of the same total size as the die 41. The anvil sections are yieldably mounted, as on springs 50 (shown schematically), inside each other, the last being stationary. The number of sections necessary varies with the size of the globe; each section should be small enough to insure equalization of pressure.

In operating the forming press, I mount the sheet 10 on the die 41, centering it by placing the hole 16 through a central mounting pin 51 on the die 41; this enters a hole 52 in the die anvil. The sheet 20 is then laid on the die, with its gores 24—25 covering the intervals between the gores 14 and the offset exactly 15° from them. This is done automatically by providing a table 53 with a center opening 54 through which the die passes; centering pins 55 are provided to position the printed sheet 10 and the transparent sheet 20 in the desired relationship.

A heating agent (steam or hot air) is introduced through the inlet port 43, and the die is moved upward. The plastic softens, so that when the die hits the central anvil section 46, the two polar caps are laminated. As shown in Figs. 5 and 6, the upstroke is continued until all the movable anvils are depressed to form a hemisphere anvil matching the die surface. At this point, lamination is complete.

A cooling agent is then introduced instead of the heating agent, and the die is started downward. By the end of the downward stroke, the hemisphere can be lifted off.

The entire operation is repeated for the other hemisphere; I obtain finished hemispheres 70, each comprising printing 75 sandwiched between an inner layer and a clear plastic outer layer, having exposed inner layer portions 71, just matched by exposed clear plastic portions 72.

The hemispheres are interlocked in register, and tubes 81—82 are inserted through the polar holes, after first mounting polar cap wedges 83 on the polar caps to hold the globe firmly. The formed globe is then laid in the female hemisphere 84 of a spherical die and the male hemisphere 85 is brought down to enclose the globe, a lip 86 acting as a seal. Heated gas, under pressure, is introduced into the interior of the globe through the tube 81, the outlet tube 82 being sealed. This heated gas not only causes lamination of the matching sections 71—72 under pressure, but welds the entire globe into a unitary object with an outer surface matching the form of the die 84—85.

After lamination is complete, the hot gas is withdrawn and replaced by a cooling fluid to set the globe; and when cool it is lifted from the die. The resultant structure is a rigid plastic sphere with the map permanently laminated between the base and the transparent outer surface. The centering holes mark the poles, and can be used for inserting an axis in the globe for mounting.

If desired, the globe can be embossed, using sectional dies 90—91, with the desired topography 92 in intaglio on its inner surface. The globe may be subjected to heat and pressure in the die to get a globe in relief, forcing hot gas in through the pipe 93 and out through the pipe 94. Any relief markings must, of course, be accurately registered with respect to the printing.

As indicated above, both the inner and outer globe are preferably made of thermoplastic resinous material, such as the various polyvinyl chlorides, polyvinylidene chlorides, polystyrene, acrylate polymers and copolymers, polyethylene, polytetrafluoroethylene etc. The inner layer is preferably opaque, the outer layer of course must be transparent. In general, sheets of plastic material of from 5 to 20 mils thick are most desirable.

If desired, the map may be printed in reverse on the inner side of the transparent plastic, and the inner plastic not printed. This permits the use of a thicker inner section, with a thinner out skin. In this case, because it is desirable to print a complete hemisphere, the inner hemispheres should be offset to produce the desired locking effect.

Although I have shown an interlocking effect by the use of alternate long and short gores, the same effect can be obtained by making all the transparent gores in one hemisphere long, and all corresponding gores in the other hemisphere short. When this is done, accurate registry is not necessary in forming the hemispheres; instead, registry must be controlled in the press in which the hemispheres are joined.

Other variations in the invention will be obvious, and can be made without departing from the scope of my invention, which is defined in the claims.

I claim:

1. As the elements of a globe, two hemispheres each consisting of an inner shell of thermoplastic material and an outer shell of transparent thermoplastic material laminated thereto with a map between printed on one of the shells, the maps on the two hemispheres forming a unitary whole when the hemispheres are properly matched, the unprinted shells of each of the hemispheres consisting of gores, alternately longer and shorter than the printed shells, and matched to each other and to the maps on their hemispheres so that when fitted together, they form a complete sphere with the maps on the two hemispheres in proper alignment with each other.

2. The method of making a globe which comprises preparing a first pair of die cut pieces of heat and pressure moldable material, each consisting of a polar cap and a plurality of gores, and map portions on the pieces which form a unitary whole when the pieces are properly matched, the pieces being deformable into matching hemispheres which together form a globe, preparing a second pair of die cut pieces of heat and pressure moldable material, having polar caps matching the polar caps of the first pieces, and having gores corresponding to the gores of the first pieces but alternately longer and shorter than the first pieces, the second pieces being deformable into matching hemispheres with serrated edges which interlock to form a globe corresponding exactly to the globe formed by the first pieces, at least one of the pairs of pieces being transparent, forming hemispheres by laying a first piece with a second piece with the map between and the transparent piece outside and with the gores of one piece offset with respect to the gores of the other piece, laminating the pieces by heat and pressure to form a double layer hemisphere with single layer protrusions and indentations, forming the second hemisphere in similar fashion with the gores of its pieces offset to exactly the same extent as the gores of the first hemisphere, matching the two hemispheres so that both the single layer protrusions and indentations and the map portions are in matching relation with each other, and then completing the globe by lamination under heat and pressure.

3. The method of claim 2, in which the first pair of pieces is of opaque material and the second pair of pieces is of transparent material.

References Cited in the file of this patent

UNITED STATES PATENTS

| Number | Name | Date |
|---|---|---|
| 930,316 | Rehm | Aug. 3, 1909 |
| 1,182,604 | Wadsworth | May 9, 1916 |
| 1,426,927 | Swinehart | Aug. 22, 1922 |
| 1,853,894 | De Laney | Apr. 12, 1932 |
| 2,185,689 | Jensen | Jan. 2, 1940 |
| 2,484,656 | Sikka et al. | Oct. 11, 1949 |
| 2,510,213 | Ekstedt et al. | June 6, 1950 |
| 2,510,215 | Pityo et al. | June 6, 1950 |
| 2,664,593 | Larson | Jan. 5, 1954 |

FOREIGN PATENTS

| Number | Country | Date |
|---|---|---|
| 16,359 | Great Britain | of 1914 |